United States Patent [19]
Agrawal et al.

[11] Patent Number: 5,813,002
[45] Date of Patent: Sep. 22, 1998

[54] METHOD AND SYSTEM FOR LINEARLY DETECTING DATA DEVIATIONS IN A LARGE DATABASE

[75] Inventors: Rakesh Agrawal, San Jose, Calif.; Andreas Arning, Wendelsheim, Germany

[73] Assignee: International Business Machines Corporation, Armonk, N.Y.

[21] Appl. No.: 692,906
[22] Filed: Jul. 31, 1996
[51] Int. Cl.$^6$ ................................................... G06F 17/30
[52] U.S. Cl. ......................... 707/5; 707/2; 707/3; 707/6
[58] Field of Search ................................. 707/2, 3, 5, 6

[56] References Cited

U.S. PATENT DOCUMENTS

| | | | |
|---|---|---|---|
| 3,670,310 | 6/1972 | Bharwani et al. | 340/172.5 |
| 3,694,813 | 9/1972 | Loh et al. | 395/850 |
| 4,290,115 | 9/1981 | Pitt et al. | 364/900 |
| 4,653,021 | 3/1987 | Takagi | 707/5 |
| 4,800,511 | 1/1989 | Tanaka | 364/521 |
| 4,839,853 | 6/1989 | Deerweater et al. | 707/5 |
| 4,868,750 | 9/1989 | Kucera et al. | 364/419 |
| 4,956,774 | 9/1990 | Shibamiya et al. | 364/200 |
| 5,031,206 | 7/1991 | Riskin | 379/97 |
| 5,129,082 | 7/1992 | Tirfing et al. | 395/600 |
| 5,168,565 | 12/1992 | Morita | 395/600 |
| 5,255,386 | 10/1993 | Prager | 707/5 |
| 5,276,629 | 1/1994 | Reynolds | 364/487 |
| 5,297,039 | 3/1994 | Kanaegami et al. | 707/5 |
| 5,351,247 | 9/1994 | Dow et al. | 395/183.02 |
| 5,375,235 | 12/1994 | Berry et al. | 395/600 |
| 5,418,951 | 5/1995 | Damashek | 395/600 |
| 5,440,481 | 8/1995 | Kostoff et al. | 707/5 |
| 5,488,725 | 1/1996 | Turtle et al. | 707/5 |
| 5,542,089 | 7/1996 | Lindsay et al. | 707/2 |
| 5,544,049 | 8/1996 | Henderson et al. | 707/7 |
| 5,544,352 | 8/1996 | Egger | 707/5 |
| 5,576,954 | 11/1996 | Driscoll | 707/3 |
| 5,598,557 | 1/1997 | Doner et al. | 707/5 |
| 5,642,502 | 6/1997 | Driscoll | 707/5 |
| 5,659,732 | 8/1997 | Kirsch | 707/5 |
| 5,666,442 | 9/1997 | Wheeler | 382/209 |
| 5,699,509 | 12/1997 | Gary et al. | 395/185.07 |

OTHER PUBLICATIONS

J. W. Shavlik, T. G. Dietterich, Reading in Machine Learning (book), Morgan Kaufman Pub. Inc., San Mateo, CA, Chapter 3 Unsupervised Concept Learning and Discovery, pp. 263–283, 1990.

P. F. Velleman, D. C. Hoaglin, Applications, Basics, & Computing of Exploratory Data Analysis (book), Chapter 3, pp. 65–81, Chapter 5, pp. 121–147, and Chapter 6, pp. 159–184, date unknown.

(List continued on next page.)

*Primary Examiner*—Thomas G. Black
*Assistant Examiner*—Frantz Coby
*Attorney, Agent, or Firm*—Khanh Q. Tran

[57] ABSTRACT

A method for detecting deviations in a database is disclosed, comprising the steps of: determining respective frequencies of occurrence for the attribute values of the data items, and identifying any itemset whose similarity value satisfies a predetermined criterion as a deviation, based on the frequencies of occurrence. The determination of the frequencies of occurrence includes computing an overall similarity value for the database, and for each first itemset, computing a difference between the overall similarity value and the similarity value of a second itemset. The second itemset has all the data items except those of the first itemset. Preferably, a smoothing factor is used for indicating how much dissimilarity in an itemset can be reduced by removing a subset of items from the itemset. The smoothing factor is evaluated as each item is incrementally removed from the itemset, thereby allowing a data item to be identified as a deviation when the difference if similarity value is the highest.

15 Claims, 2 Drawing Sheets

OTHER PUBLICATIONS

D. Chamberlin, Using the New DB2 IBM's Object–Relational Database System, Chapter 5, Active Data, pp. 323–342. (book), date unknown.

D. C. Hoaglin, F. Mosteller, J. W. Tukey, Understanding Robust and Exploratory Data Analysis, (book) J. Wiley & Sons, Inc., pp. 1–55, date unknown.

L. G. Valiant, A Theory of the Learnable (Artificial Intelligence and Language Processing, Inductive Learning from Preclassified Training Examples, pp. 192–200, date unknown.

D. E. Rumelhart and D. Zipser, Freature Discovery by Competitive Learning, Orig. Pub. in Cognitive Science, 9.1, 1985, pp. 307–325.

J. R. Quinlan, 2.2 Algorithms, Induction of Decision Trees, Orig. Pub. in Machine Learning, 1:81–106, 1986, Kluwer Academic Publishers, Boston, pp.57–69.

R. S. Michalski, R. E. Stepp, Learning from Observation: Conceptual Clustering, Chapter 11, pp. 331–362, date unknown.

S. J. Hanson, M. Bauer, Conceptual Clustering, Categorization, and Polymorphy, Machine Learning 3: 343–372, 1989, Kluwer Academic Publishers—Manufactured in The Netherlands.

D. H. Fisher, Knowledge Acquistion via Incremental Conceptual Clustering, Originally Published in Machine Learning, 2: 139–172, 1987 Kluwer Academic Publishers, Boston, 3.2.1 pp. 267–283.

D. Angluin, P. Laird, Learning from Noisy Examples, 1988 Kluwer Academic Publisher, Boston, Manufactured inThe Netherlands, Maching Learning 2: 343–370, 1988.

D. W. Aha, D. Kibler, M. K. Albert, Instance–Based Learning Algorithms Machine Learning, 6, 37–66, 1991, Kluwer Academic Publishers Boston Manufactured in The Netherlands.

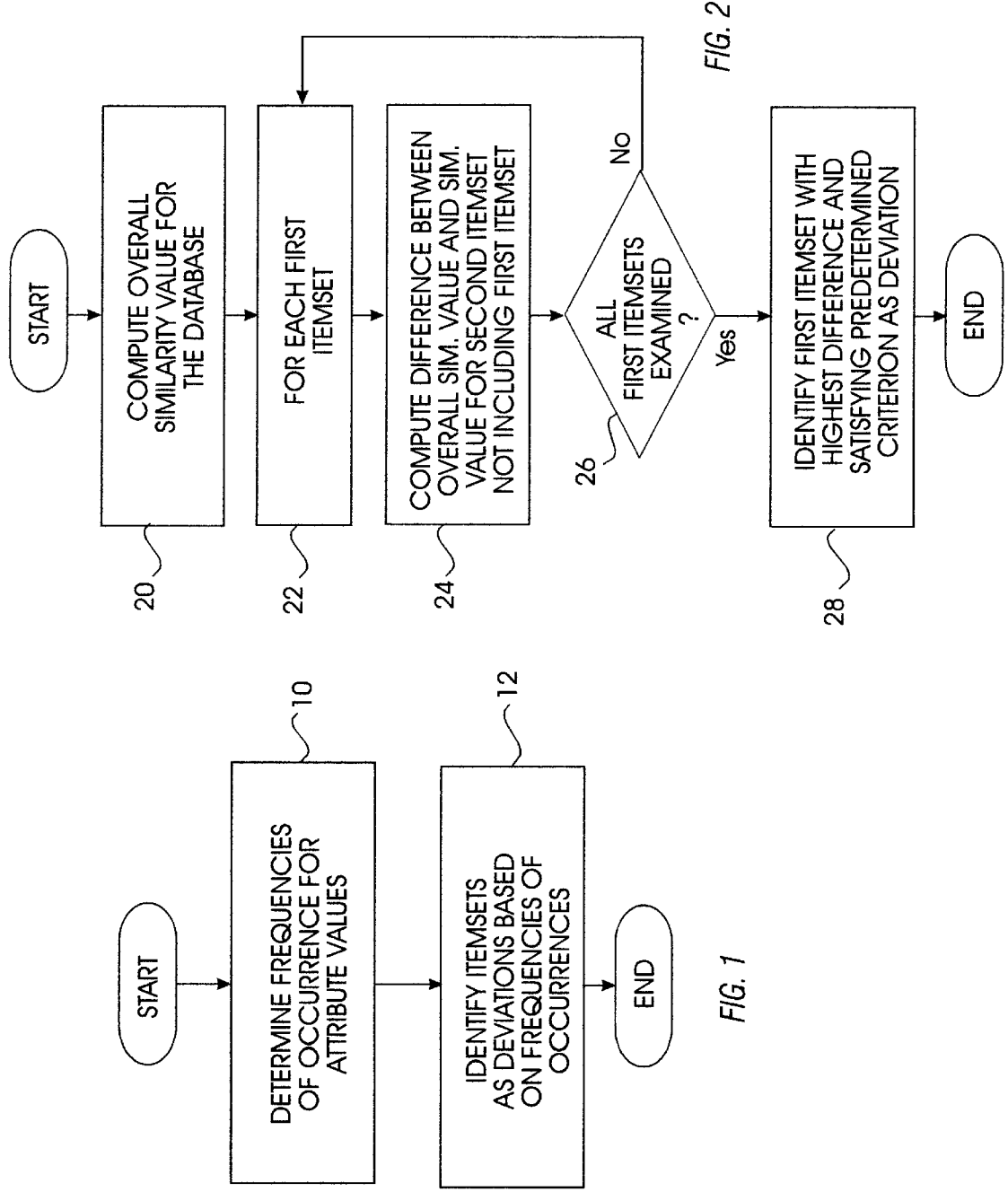

METHOD AND SYSTEM FOR LINEARLY DETECTING DATA DEVIATIONS IN A LARGE DATABASE

FIELD OF THE INVENTION

The present invention relates in general to computer databases. More particularly, the present invention relates to a method and system for linearly detecting data deviations in a large database.

BACKGROUND OF THE INVENTION

The importance of detecting deviations or exceptions of data in a database has been recognized in the past, especially in the fields of machine learning and maintaining data integrity in large databases. Deviations are often viewed as outliers, errors, or noise in the data. As a related art, statistical methods have been used for identifying outliers in numerical data. See, for example, "*Understanding Robust and Exploratory Data Analysis*," D. C. Hoaglin et al., 1983. Typically, these methods first compute the average and standard deviation of the data values in the data set. The data values that lie beyond three standard deviations from the average are considered deviations. However, such detection methods suffer two major limitations. They assume that a metrical distance function exists, and that they are only applicable to numerical values.

Assuming that data elements are represented as points in a space, one can use different functions to specify the distance between two data elements. For a distance function to be metrical, it must satisfy certain properties. For example, given data elements x and y in a dataset, a metrical distance function typically has the following properties:

$$d(x,y)=0 \iff x=y \quad (1)$$

$$d(x,y)=d(y,x) \text{ and} \quad (2)$$

$$d(x,y)+d(y,z) \geq d(x,z) \quad (3)$$

The expression (1) states that the distance between data elements x and y is zero if and only if x and y are the same data element. The expression (2) means that the distance from data element x to data element y is the same as the distance from data element to data element x. Finally, the expression (3) means that the sum of the distance between data elements x and y, and the distance between elements y and z is greater than or equal to the distance between data elements x and z.

Another approach for detecting deviations in a database is to use explicit information residing outside the data such as data integrity constraints or predefined error/non-error patterns. Detection methods using integrity constraints are described, for instance, in "*Using the New DB2: IBM's Object-Relational Database System*," Morgan Kaufman, 1996. As an example of constraint-based detection, assuming that one of the attributes of the data is a person's age, an integrity constraint may be that the value of the attribute age must be less than 90. When this constraint is applied to the data, any person having the age of 90 or more will be detected as a deviation.

For deviation detection methods based on error patterns, an example of the error patterns would be a regular expression of the form [a–z, A–Z]+, meaning that a valid character string consists only of letters. By applying this pattern to the data, one can isolate those strings which do not follow this pattern as deviations. A drawback of this approach is that its success depends on the knowledge of the person specifying the error pattern concerning the target data. Such knowledge must be available to that person from a source external to the data, rather than from the data itself.

Alternatively, the problem of detecting deviations can be considered as a special case of clustering of data. Data clustering methods are described, for instance, in "*Readings in Machine Learning, Series in Machine Learning*," edited by J. W. Shavlik and T. G. Dietterich, Morgan Kaufman, 1990. In the case of deviation detection, the data is clustered into two groups: deviations and non-deviations. However, the usual clustering methods are biased toward discarding deviations as noise. Consequently, a direct application of these methods will not yield the desired deviations in the database.

As an example of this limitation, consider a popular clustering algorithm in which k clusters are to be found from the data. The algorithm starts by randomly choosing k points (or data items) as cluster centers and then examines the rest of the data points one after another. For each data point, the algorithm finds the cluster center nearest to the examined data point and assigns it to the corresponding data cluster. Once a data point is assigned to a cluster, the center for that data cluster is recomputed. If this algorithm is used to find two clusters, we are likely to end up with two clusters, each having a concentration of majority of the data points, rather than two clusters where one contains deviations (small minority) and the other one contains non-deviations (large majority). In addition to not yielding desired deviations, another limitation of the clustering methods is that they generally require a metrical distance function with the properties discussed earlier.

Therefore, there remains a need for a method for detecting deviations in a database that is applicable to both numeric and non-numeric data, does not require a metrical distance function or external constraint specifications, and is not biased toward discarding deviations as noise.

SUMMARY OF THE INVENTION

It is an object of the present invention to provide a method for detecting deviations in a large database that does not require a metrical distance function having certain properties regarding the metrical distance between data elements in the database. In this regard, the present invention allows the detection of deviations whenever a degree of dissimilarity in the database is increased due to a particular element in the data, rather than requiring the metrical conditions to be satisfied.

It is another object of the present invention to provide a deviation detection method that is applicable to both numerical and non-numerical data values. Consequently, the method may be used in a wide spectrum of applications, such as those in data mining area, where many of the data attributes are nonnumerical or categorical.

It is a further object of the present invention to provide a deviation detection method that does not rely on explicit information external to the data such as integrity constraints or error/non-error patterns. The result of the method therefore does not depend on the user's knowledge of the data when the constraints or patterns are specified. Rather, the invention uses implicit redundancy in the data to automatically detect the deviations.

It is yet another object of the present invention to provide a deviation detection method that is not biased toward discarding deviations as noise as in the case of clustering methods. In addition, it is desirable that the method executes in linear time, rather than exponential time, and still detects the deviations correctly and efficiently.

To achieve these and other objects, the present invention provides a method for detecting deviations in a database having many data items, each item being characterized by one or more attribute values. An itemset is defined as a set of one or more data items, and associated with a similarity value derived from the attribute values of the data items included in that itemset. The method determines the frequencies of occurrence for the respective attribute values, and identifies any itemset whose similarity value satisfies a predetermined criterion as a deviation, based on the relative frequencies of occurrence of the attribute values.

In accordance with the invention, the method includes the step of computing an overall similarity value for the database in determining the frequencies of occurrence of the attribute values. The overall similarity value is the similarity value for an itemset that has all the data items of the database. The method also computes, for each first itemset, a difference between the overall similarity value and the similarity value for a second itemset. The second itemset includes all the data items in the database except those of the first itemset.

The step of identifying deviations includes the step of identifying as deviations those first itemsets resulting in the greatest difference in similarity value, and also satisfying the predetermined deviation criterion.

In a preferred embodiment of the invention, the method further includes the step of computing a smoothing factor that represents a reduction in similarity between any two itemsets, when a group of data items common to both itemsets is disregarded in computing the difference in similarity value.

According to the invention, the step of computing the smoothing factor includes, for each ordered sequence of N data items, and for each value of index i where i=1 to N−1, the steps of: (a) computing the similarity value for a first itemset that includes the first i data items of the ordered sequence; (b) computing the similarity value for a second itemset that includes the first (i+1) data items of the ordered sequence; (c) computing the difference in similarity value between the first and second itemsets; and (d) identifying any first data item in the sequence as a deviation in the database, wherein the first and second itemsets differ only by the first data item, and the computed difference in similarity value between the first and second itemsets is the highest.

In another preferred embodiment of the invention, steps (a–d) are executed for each of m ordered sequences, where the order of the items in each sequence is randomized to alleviate the sensitivity of results to the order of input.

In yet another embodiment of the invention, the method further includes, for each identified first data item, the step of identifying any second data item in the ordered sequence as a deviation, wherein the second data item is after the first data item in the sequence, and the computed differences in similarity value corresponding to the first and second data items are generally the same.

Accordingly, the present invention provides a method for detecting data deviations in a database that is far more versatile and efficient that conventional methods. Specifically, neither a metrical distance function nor the user's knowledge of the data is required. The method is applicable to data having either numeric or categorical attributes. In addition, the method is capable of detecting desired deviations instead of discarding them as noise in the data.

Additional objects and advantages of the present invention will be set forth in the description which follows, and in part will be obvious from the description and with the accompanying drawing, or may be learned from the practice of this invention.

BRIEF DESCRIPTION OF THE DRAWINGS

FIG. 1 is a high-level flow chart showing the general operation of the method for detecting data deviations in a database in accordance with the present invention.

FIG. 2 is a flow chart showing further details of the steps of determining frequencies of occurrence and identifying a deviation, from steps 10 and 12 of FIG. 1, respectively.

DESCRIPTION OF THE PREFERRED EMBODIMENT

Figure 3:
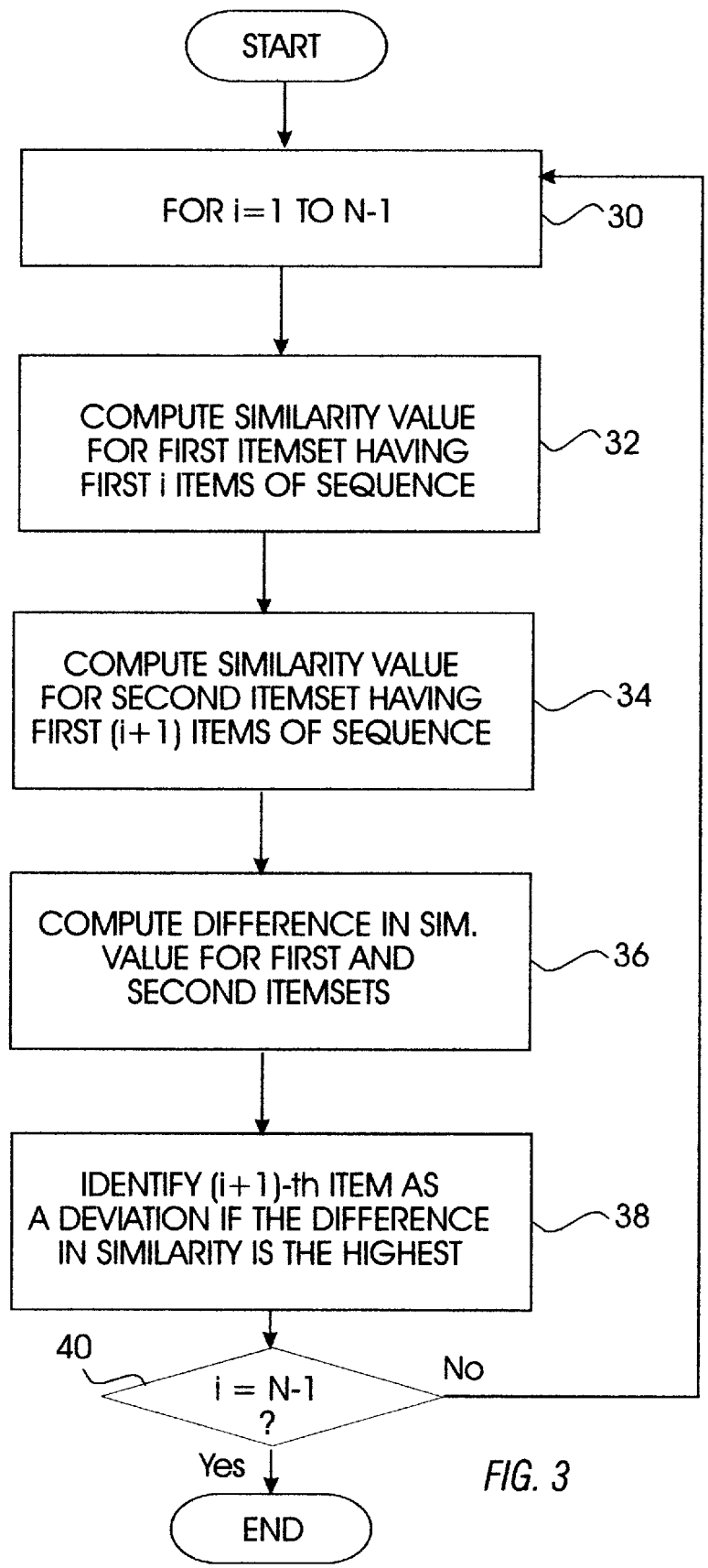
FIG. 3 is a flow chart showing further details of the step of computing a smoothing factor representing a reduction in similarity between any two itemsets, The smoothing factor may be used for indicating the similarity value difference, step 24 of FIG. 2, and for identifying deviations, step 28 of FIG. 2.

The invention is primarily described as a method for detecting deviations (also referred to as exceptions, outliers, errors, or noise) in a large database. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

FIG. 1 illustrates a high-level flow chart of the method for detecting deviations in a database typically having numerous data items, in accordance with the invention.

Each data item is characterized by one or more data attribute values. For example, a data item in an employee database may have respective values for attributes job type, age, and salary. In this case, job type is a categorical (or nonnumerical) attribute, while age and salary are numerical attributes.

An itemset is defined as a subset of the data items in the database, and may include zero or any number of data items. Each itemset is associated with a similarity value representing the similarity (or dissimilarity) among the data items making up the itemset, with regard to the particular attribute and as compared against the rest of the database. For instance, the similarity value may be calculated based on the attribute values of the data items in the respective itemset.

Starting at step 10 of FIG. 1, a frequency of occurrence for each attribute value is determined. For example, a count of the number of times a particular attribute value appears in the database may be used for this purpose. At step 12, the method identifies any itemset that has a similarity value satisfying a predetermined deviation criterion as a deviation. This identification is also based on the frequencies of occurrence for the attribute values, the frequencies of occurrence for the attribute values being considered relative to each other.

FIG. 2 shows further details of the steps 10 and 12 of FIG. 1. In particular, the step 10, for determining frequencies of occurrence for respective attribute values, preferably includes steps 20 through 26 of FIG. 2. At step 20, the method computes an overall similarity value for the database. The overall similarity value is the similarity for an itemset that includes all of the data items in the database. At step 22, for each possible itemset, which is designated a first itemset, a difference between the overall similarity value and the similarity for a second itemset is calculated at step 24. The second itemset includes all of the data items in the database except those in the first itemset. The step 24, for computing the similarity difference, is repeated for each first itemset including a subset of the data items in the database, as shown by step 26.

In addition, the step 12 of FIG. 1, for identifying a deviation, preferably includes step 28, for identifying as a deviation any first itemset that results in the highest similarity value difference (computed in step 24), and also satisfies the predetermined deviation criterion.

Intuitively, given a first itemset I, a deviation or exception set is a subset of the data items that contributes most to the dissimilarity of the itemset I with the least number of items. To help evaluate the dissimilarity of an itemset, a measure called a smoothing factor may be used for indicating how much the dissimilarity among data items in the itemset can be reduced by removing a subset $I_j$ of data items from the itemset I. In other words, the smoothing factor represents a reduction in dissimilarity between any two itemsets when a subset of the data items common to the two itemsets is disregarded.

Formally, the problem of deviation detection can be described as follows. Given:

a set of items I;

a dissimilarity function D that computes, for a combination of items from I, a value representing the dissimilarity in that combination; and a cardinality function C that is a function of the size of the combination.

A smoothing factor for a subset $I_j$ of i is defined as:

$$SF(I_j):=C(I-I_j)*(D(I)-D(I-I_j))$$

A subset $I_x \subseteq I$ is a deviation set of set I with respect to functions C and D if:

$$SF(I_x) \leq SF(I_j) \text{ for all } I_j \subseteq I$$

As an example, consider a set I of integer values where I ={1, 4, 4, 4}. Let the dissimilarity function D be the variance of the numbers in the set I, i.e., $$D = \frac{1}{N} \sum_{i=1}^{N} (x_i - \bar{x})^2$$

where x is the integer value.

Let the cardinality function C be the count of the elements in the set I. By computing the smoothing factor $SF(I_j)$ using the above formula, for each candidate deviation set $I_j$, the following results are obtained.

| $I_j$ | $I-I_j$ | $C(I-I_j)$ | $D(I-I_j)$ | $SF(I_j)$ |
|---|---|---|---|---|
| {} | {1,4,4,4} | 4 | 1.69 | 0.00 |
| {4} | {1,4,4} | 3 | 2.00 | −0.94 |
| {4,4} | {1,4} | 2 | 2.25 | −1.13 |
| {4,4,4} | {1} | 1 | 0.00 | 1.69 |

-continued

| $I_j$ | $I-I_j$ | $C(I-I_j)$ | $D(I-I_j)$ | $SF(I_j)$ |
|---|---|---|---|---|
| {1} | {4,4,4} | 3 | 0.00 | 5.06 |
| {1,4} | {4,4} | 2 | 0.00 | 3.38 |
| {1,4,4} | {4} | 1 | 0.00 | 1.69 |

The above results show that the candidate deviation set $I_j=\{1\}$ corresponds to the highest smoothing factor, i.e., 5.06. Thus, the candidate deviation set $I_j=\{1\}$, and only this one set, qualifies as a deviation set $I_x$ with respect to the specified dissimilarity function D and cardinality function C. Note that the calculation of the smoothing factor in this example corresponds to the step of calculating the difference in similarity value, as shown in step 24 of FIG. 2.

In mathematical terms, the problem of detecting exact deviations in general is NP-hard, i.e., there are choices of functions C and D for which the deviation detection will take exponential time to perform. We therefore resort to an approximate solution that can be formally described as follows.

Given:

a set of data items I;

a sequence S of n subsets $I_1, I_2, \ldots I_j$ with $2 \leq n \leq |I|$, $I_j \subseteq I$, and $I_{j-1} \subseteq I_j$;

a dissimilarity function D, with respect to S; and a cardinality function C, with $I_1 \subseteq I_2 \rightarrow C(I_1) < C(I_2)$ for all $I_1, I_2 \subseteq I$.

A smoothing factor SF' for each subset $I_j$ of I is then defined as:

$$SF'(I_j):=C(I-I_{j-1})*(D_s(I_j)-D_s(I_{j-1}))$$

Thus $I_x \subseteq I$, $I_x=(I-I_{j-1})$, $j>1$ is an approximate deviation set of I with respect to $D_s$, C, and the sequence S if:

$$SF'(I_x) \leq SF'(I_j) \text{ for all } I_j \text{ occurring in } S.$$

Observe that the smoothing factor SF for each subset $I_j$ considers the dissimilarity difference with respect to the preceding subset in S, instead of the dissimilarity between set I and the complementary set (I−$I_j$). It should also be noted that the described approximation simulates a mechanism quite familiar to human beings: after seeing a series of familiar data, an element disturbing the series is considered a deviation or exception, even without being told explicitly the rules defining such a deviation. For instance, in the preceding example, the candidate deviation set $I_j=\{1\}$ was detected as a deviation set when a measure of its dissimilarity, i.e., the smoothing factor, was found to be the highest in comparison to the rest of the data.

Based on the above approximation, the preferred embodiment of the present invention further includes the step of computing a smoothing factor that represents a reduction in similarity between any two itemsets when a subset of the data items common to the two itemsets is disregarded. The smoothing factor represents the difference in similarity value computed in step 24 of FIG. 2, and helps identify the deviations from the candidate itemsets, shown in step 28 of FIG. 2.

FIG. 3 is a flow chart showing details of the step of computing the smoothing factor, which incorporates the approximation described above. Starting at step 30, for each ordered sequence of N data items and for each value of index i, where i=1 to N−1 and N is the number of data items in the database, the steps 32 through 38 are performed. At step 32, the similarity value for a first itemset including the first i data items of the ordered sequence being examined is computed. At step 34, the similarity value for a second itemset that includes the first (i+1) data items of the ordered sequence is computed. The difference in similarity value between the first and the second itemsets is then calculated at step 36. Any first data item of the ordered sequence is identified as a deviation in the database, at step 38, if the first and second itemsets are different only by this data item and the computed difference in similarity value is the highest.

Preferably, the steps 32 through 38 are performed for each of m randomized ordered sequences of data items used as an input, to alleviate the sensitivity of the results due to the order of the data items in the input sequences. The value of parameter m is provided by the user. If the value of m is relatively small, e.g., for m=10, and if the user-provided dissimilarity function D allows $D(I_1)$ to be computed incrementally from $D(I_{j-1})$ and $i_j$ using constant time and space, then all of the steps 32–38 of FIG. 3 are constant in space and have an order of O(N) in time consumption. N is the number of data items in the input ordered sequence.

With random access to the data, the randomization of the input sequences, i.e., by performing the steps 32–38 for m random ordered sequences, can be done in O(N) time, and in O(N log N) time even with sequential access to the data. Moreover, if each input sequence of data items is already randomized, the method may process a random choice of sequence as a start record and continue with the remaining sequences in a wrap-around manner. Thus, this pseudo-randomizing step would also work in linear time, i.e., O(N), as in the case of performing steps 32–38 for m random sequences.

Evaluations Results

The following deviation results were obtained when the method of the present invention was applied to three actual samples of data: control data for the landing of a space shuttle, data for an echo-cardiogram, and the daily closing prices of IBM stock. In each instance, each line in the databases is considered a data item. The goal is to identify lines in each database that violate frequently occurring character patterns. In all cases, the same dissimilarity function is used for handling the comparison of the character strings. The dissimilarity function maintains a pattern in the form of a regular expression that matches all the character strings seen so far. Starting with a pattern that is the same as the first string seen, the pattern may have to be weakened by introducing wildcard characters as more strings are seen to cover all the examined strings. A wildcard character is indicated as an asterisk (*) in the examples that follow. The weakening in the covering pattern is captured by the dissimilarity function, and the dissimilarity increase, when the pattern covering the j−1 strings in $I_{j-1}$ does not cover the j-th string from the set $(I_j-I_{j-1})$.

The dissimilarity function is defined as:

$$D_s(I_j) := 0 \text{ and}$$

$$D_s(I_j) := D_s(I_{j-1}) + j \times \frac{M(I_j) - M(I_{j-1})}{M(I_j)}$$

where $M(I_j)$ is computed from the string pattern that covers all elements. That is, $$M(I_j) := \frac{1}{3 \times c - w + 2}$$

Here, c is the total number of characters and w is the number of needed wildcard characters. Note that a weighting is done in the computation of the distance function by the position j of the input string. This weighting means that a weakening of the pattern is quite likely for data items that appear earlier in the input, and improbable for data items that appear later in the input.

a) Sample database No. 1: shuttle-landing control data

2,*,*,*,*,*,2
1,2,*,*,*,*,1
1,1,2,*,*,*,1
1,1,1,*,*,*,1
1,1,3,2,2,*,1
1,*,*,*,*,4,1
2,1,4,*,*,1,1
2,1,4,*,*,2,1
2,1,4,*,*,3,1
2,1,3,1,1,1,1
2,1,3,1,1,2,1
2,1,3,1,2,1,1
2,1,3,1,2,2,1
1,1,3,1,1,3,1
2,1,3,1,2,3,1
Detected deviation: 2,*,*,*,*,*,2 b) Sample database No. 2: echo-cardiogram data 11,0,71,0,0.260,9,4.600,14,1,1,name,1,0
19,0,72,0,0.380,6,4.100,14,1.700,0.558,name,1,0
16,0,55,0,0.260,4,3.420,14,1,1,name,1,0
57,0,60,0,0.253,12.062,4.603,16,1.450,0.788,name,1,0
19,1,57,0,0.160,22,5.750,18,2.250,0.571,name,1,0
26,0,68,0,0.260,5,4.310,12,1,0.857,name,1,0
13,0,62,0,0.230,31,5.430,22.5,1.875,0.857,name,1,0
50,0,60,0,0.330,8,5.250,14,1,1,name,1,0
19,0,46,0,0.340,0,5.090,16,1.140,1.003,name,1,0
25,0,54,0,0.140,13,4.490,15.5,1.190,0.930,name,1,0
10,1,77,0,0.130,16,4.230,18,1.800,0.714,name,1,1
52,0,62,1,0.450,9,3.600,16,1.140,1.003,name,1,0
52,0,73,0,0.330,6,4,14,1,1,name,1,0
44,0,60,0,0.150,10,3.730,14,1,1,name,1,0
0.5,1,62,0,0.120,23,5.800,11.67,2.330,0.358,name,1,1
24,0,55,1,0.250,12.063,4.290,14,1,1,name,1,0
0.5,1,69,1,0.260,11,4.650,18,1.640,0.784,name,1,1
0.5,1,62.529,1,0.070,20,5.200,24,2,0.857,name,1,1
22,1,66,0,0.090,17,5.819,8,1.333,0.429,name,1,0
1,1,66,1,0.220,15,5.400,27,2.250,0.857,name,1,1
...
Detected deviation: ,?,?,77,?,?,?,?,?,2,?,name,2,?

c) Sample database No. 3: IBM stock price data

| 58/07/01 | 368.50 | 313.23 | .022561 |
|---|---|---|---|
| 58/07/02 | 369.50 | 314.08 | .022561 |
| 58/07/03 | 369.25 | 313.87 | .022561 |
| 58/07/04 | Market closed | | |
| 58/07/07 | 370.00 | 314.50 | .022561 |
| 58/07/08 | 369.00 | 313.65 | .022561 |
| 58/07/09 | 368.00 | 312.80 | .022561 |
| 58/07/10 | 368.25 | 313.02 | .022561 |
| 58/07/11 | 368.50 | 313.23 | .022561 |
| 58/07/14 | 360.00 | 306.00 | .022561 |
| 58/07/15 | 356.00 | 302.60 | .022561 |
| 58/07/16 | 359.50 | 305.58 | .022561 |
| 58/07/17 | 359.50 | 305.58 | .022561 |
| 58/07/18 | 357.50 | 303.88 | .022561 |
| 58/07/21 | 361.00 | 306.85 | .022561 |
| 58/07/22 | 363.00 | 308.55 | .022561 |
| 58/07/23 | 366.50 | 311.53 | .022561 |
| 58/07/24 | 368.00 | 312.80 | .022561 |
| 58/07125 | 370.00 | 314.50 | .022561 |
| 58/07/28 | 370.25 | 314.72 | .022561 |

...

Detected deviations:

| 58/07/04 | Market closed | (317 instances) |
|---|---|---|
| 59/01/06 | 2.5% Stock Dividend | (2 instances) |
| 59/05/05 | 50% Stock Split | (7 instances) |
| 73/10/09 | IBM not traded | (1 instance) |
| 88/09/26 | Data suspect | (30 instances) |

Out of the 9415 records in the sample database No. 3, a deviation set of 357 data items was created. Only one exemplar for each deviation type is shown here. It should be noted that the different instances of a deviation type are not duplicates of each other, but differ by their dates.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer subsystem embodying the method of the invention.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method for detecting deviations in a database having a plurality of data items, each data item being characterized by an attribute value, each subset of the data items being an itemset, and each itemset having a similarity value based on the attribute values of the data items in the itemset, the method comprising the steps of:

determining a frequency of occurrence for each attribute value;

identifying any itemset whose similarity value satisfies a predetermined deviation criterion as a deviation, based on relative frequencies of occurrence of the attribute values; and computing a smoothing factor that represents a reduction in similarity between any two itemsets when a subset of the data items common to the two itemsets is disregarded.

2. The method as recited in claim 1, wherein:

a) the step of determining a frequency of occurrence includes the steps of:

i) computing an overall similarity value for the database, the overall similarity value being the similarity value for the itemset that includes all the data items of the database; and ii) for each first itemset, computing a difference between the overall similarity value and the similarity value of a second itemset, the second itemset including all the data items in the database except those in the first itemset; and b) the step of identifying includes identifying as deviations those first itemsets resulting in the highest difference and also satisfying the predetermined deviation criterion.

3. The method as recited in claim 1, wherein the step of computing a smoothing factor includes the steps, for each ordered sequence of N data items and for i=1 to N−1, of:

a) computing the similarity value for a first itemset that includes the first i data items of the ordered sequence;

b) computing the similarity value for a second itemset that includes the first (i+1) data items of the ordered sequence;

c) computing the difference in similarity value between the first and second itemsets; and d) identifying any first data item of the ordered sequence as a deviation in the database, wherein the first and second itemsets are different only by the first data item, and the computed difference in similarity value is the highest.

4. The method as recited in claim 3, further comprising the step of executing the steps (a–d) for m random ordered sequences of the data items, m being a predetermined parameter.

5. The method as recited in claim 3, further comprising, for each identified first data item, the step of identifying any second data item in the ordered sequence, following the first data item, as a deviation, wherein the differences in similarity value corresponding to the first and second data items are generally the same.

6. A computer program product for use with a computer system for detecting deviations in a database having a plurality of data items, each data item being characterized by an attribute value, each subset of the data items being an itemset, and each itemset having a similarity value based on the attribute values of the data items in the itemset, the computer program product comprising:

a computer-readable medium;

means, provided on the computer-readable medium, for directing the system to determine a frequency of occurrence for each attribute value;

means, provided on the computer-readable medium, for directing the system to identify any itemset whose similarity value satisfies a predetermined deviation criterion as a deviation, based on relative frequencies of occurrence of the attribute values; and means, provided on the computer-readable medium, for directing the system to compute a smoothing factor that represents a reduction in similarity between any two itemsets when a subset of the data items common to the two itemsets is disregarded.

7. The computer program product as recited in claim 6, wherein:

a) the means for directing to determine a frequency of occurrence includes:

i) means, provided on the computer-readable medium, for directing the system to compute an overall similarity value for the database, the overall similarity value being the similarity value for the itemset that includes all the data items of the database; and ii) for each first itemset, means, provided on the computer-readable medium, for directing the system to compute a difference between the overall similarity value and the similarity value of a second itemset, the second itemset including all the data items in the database except those in the first itemset; and b) the means for directing to identify includes means, provided on the computer-readable medium, for directing the system to identify those first itemsets resulting in the highest difference and also satisfying the predetermined deviation criterion.

8. The computer program product as recited in claim 6, wherein the means for directing to compute a smoothing factor includes, for each ordered sequence of N data items and for i=1 to N−1:

a) means, provided on the computer-readable medium, for directing the system to compute the similarity value for a first itemset that includes the first i data items of the ordered sequence; and b) means, provided on the computer-readable medium, for directing the system to compute the similarity value for a second itemset that includes the first (i+1) data items of the ordered sequence;

c) means, provided on the computer-readable medium, for directing the system to compute a difference in similarity value between the first and second itemsets;

d) means, provided on the computer-readable medium, for directing the system to identify any first data item of the ordered sequence as a deviation in the database, wherein the first and second itemsets are different only by the first data item, and the computed difference in similarity value is the highest.

9. The computer program product as recited in claim 8, further comprising means, provided on the computer-readable medium, for directing the system to repeat the operation of the means (a–d) for m random ordered sequences of the data items, m being a predetermined parameter.

10. The computer program product as recited in claim 8, further comprising for each identified first data item, means, provided on the computer-readable medium, for directing the system to identify any second data item in the ordered sequence, following the selected data item, as a deviation, wherein the differences in similarity value corresponding to the first and second data items are generally the same.

11. A computer-based system for detecting deviations in a database having a plurality of data items, each data item being characterized by an attribute value, each subset of the data items being an itemset, and each itemset having a similarity value based on the attribute values of the data items in the itemset, the system comprising:

means for determining a frequency of occurrence for each attribute value;

means for identifying any itemset whose similarity value satisfies a predetermined deviation criterion as a deviation, based on relative frequencies of occurrence of the attribute values; and means for computing a smoothing factor that represents a reduction in similarity between any two itemsets when a subset of the data items common to the two itemsets is disregarded.

12. The system as recited in claim 11, wherein:

a) the means for determining a frequency of occurrence includes:

i) means for computing an overall similarity value for the database, the overall similarity value being the similarity value for the itemset that includes all the data items of the database; and ii) for each first itemset, means for computing a difference between the overall similarity value and the similarity value for a second itemset, the second itemset including all the data items in the database except those in the first itemset; and b) the means for identifying includes means for identifying as deviations those first itemsets resulting in the highest difference and also satisfying the predetermined deviation criterion.

13. The system as recited in claim 11, wherein the means for computing a smoothing factor includes, for each ordered sequence of N data items and for i=1 to N−1:

a) means for computing the similarity value for a first itemset that includes the first i data items of the ordered sequence;

b) means for computing the similarity value for a second itemset that includes the first (i+1) data items of the ordered sequence;

c) means for computing the difference in similarity value between the first and second itemsets; and d) means for identifying any first data item of the ordered sequence as a deviation in the database, wherein the first and second itemsets are different only by the first data item, and the computed difference in similarity is maximized.

14. The system as recited in claim 13, further comprising means for repeating the operation of the means (a–d) for m random ordered sequences of the data items, m being a predetermined parameter.

15. The system as recited in claim 14, further comprising, for each identified first data item, means for identifying any second data item in the ordered sequence, following the selected data item, as a deviation, wherein the differences in similarity value corresponding to the first and second data items are generally the same.

* * * * *